Dec. 18, 1923.　　　　　　　　　　　　　　　1,477,667
G. SCHLUESSELBURG
COOKING UTENSIL
Filed May 26, 1922　　　3 Sheets-Sheet 1

Inventor.
George Schluesselburg,

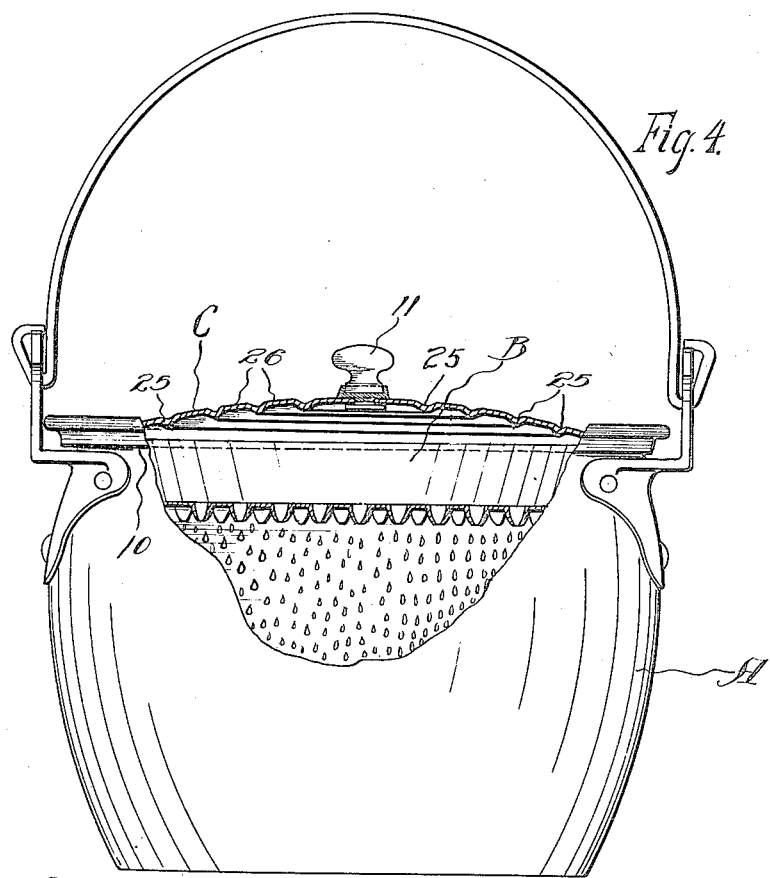
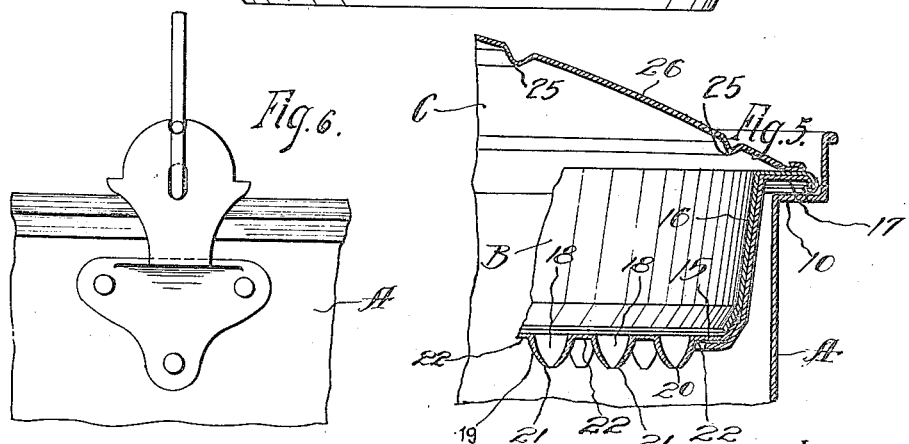

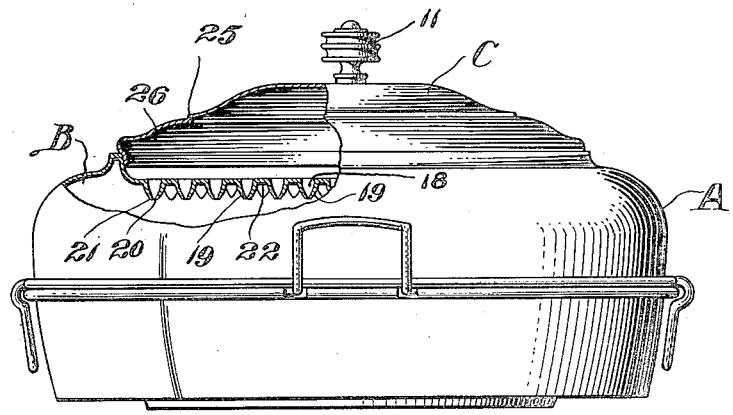
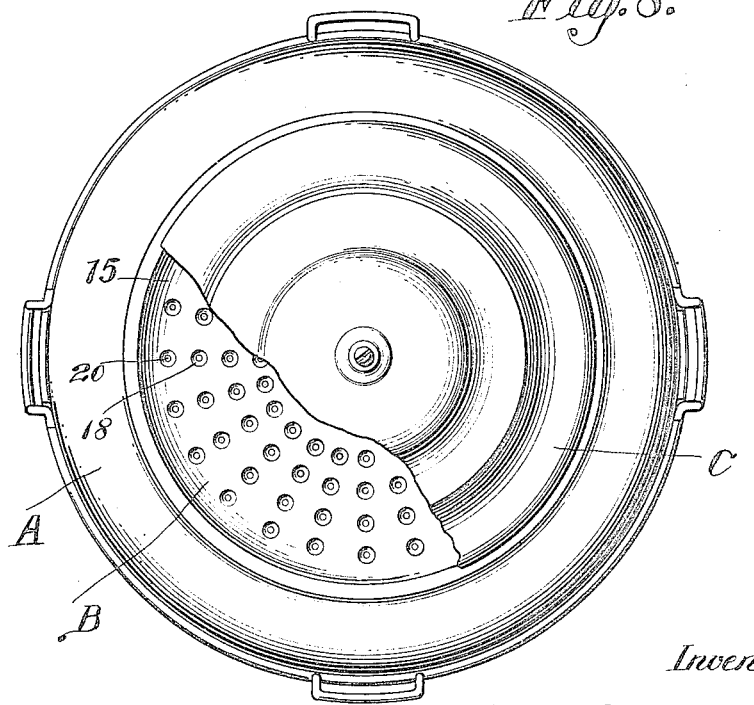

Patented Dec. 18, 1923.

1,477,667

UNITED STATES PATENT OFFICE.

GEORGE SCHLUESSELBURG, OF CHICAGO, ILLINOIS, ASSIGNOR TO ANNA MEYER, TRUSTEE, OF CHICAGO, ILLINOIS.

COOKING UTENSIL.

Application filed May 26, 1922. Serial No. 563,804.

*To all whom it may concern:*

Be it known that I, GEORGE SCHLUESSELBURG, a citizen of the German Republic, residing at Chicago, in the county of Cook and State of Illinois, have invented certain new and useful Improvements in Cooking Utensils, of which the following is a specification.

This invention relates to improvements in cooking utensils in the nature of vessels, kettles, or frying pans, and particularly to means for basting the food products contained therein during the cooking operation.

Various objects, uses and advantages are derivable from my invention, all as will more clearly hereinafter appear from the specification and claims. One exemplification of my invention is set forth in the accompanying drawings in the manner following:

Fig. 4 is a side elevation of the vessel with a portion of its walls broken away to exhibit the steaming tray and cover in assembled relation therewith;

Fig. 5 is an enlarged fragmentary section showing the cover, steaming tray, and vessel in operative relation;

Fig. 6 shows in elevation a connection between the handle and vessel proper;

Fig. 7 is a side elevation of a broiler or frying pan, a portion of the proximate wall being broken away to exhibit the interior construction which embodies the features of this invention; and Fig. 8 is a plan view thereof with a portion of the cover broken away to exhibit the interior parts.

Referring particularly to Fig. 4 the cooking utensil is here shown to comprise three principal elements, viz: a vessel or kettle A wherein is removably supported a tray or shelf B over which is mounted a cover or lid C crowned in the usual manner. The vessel may be of ordinary construction with cylindrical walls offset near their upper edges to provide a shoulder 10. The cover C, which is provided with a central handle 11 for convenience in manipulation, is ordinarily rested upon the shoulder so provided, but with the utensil of my invention is rested instead upon the tray which itself is supported upon the shoulder, as best shown in Fig. 5. If desired, a spring or weighted valve (not shown) may be provided in the handle for the release of any excess of steam pressure that develops during the cooking operation.

Figure 1:
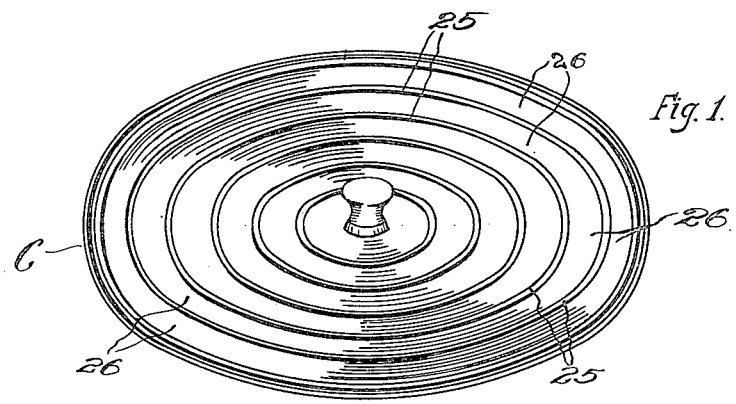
Figure 1 is a perspective view of the lid or cover forming part of the present utensil.
Figure 2:
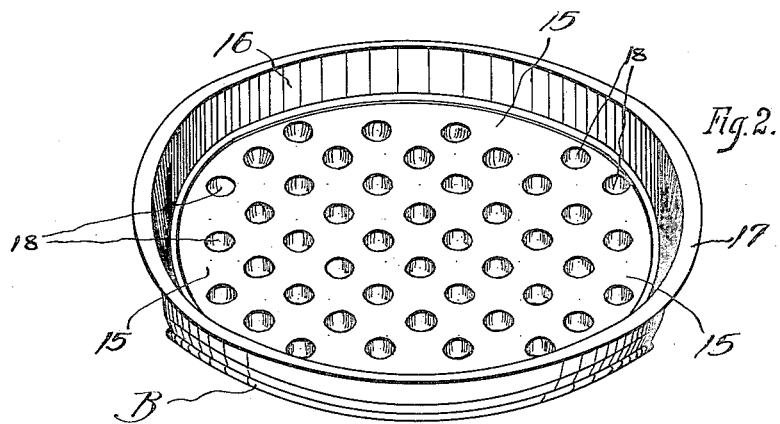
Fig. 2 is a similar view of the removable condensing or steaming tray.
Figure 3:
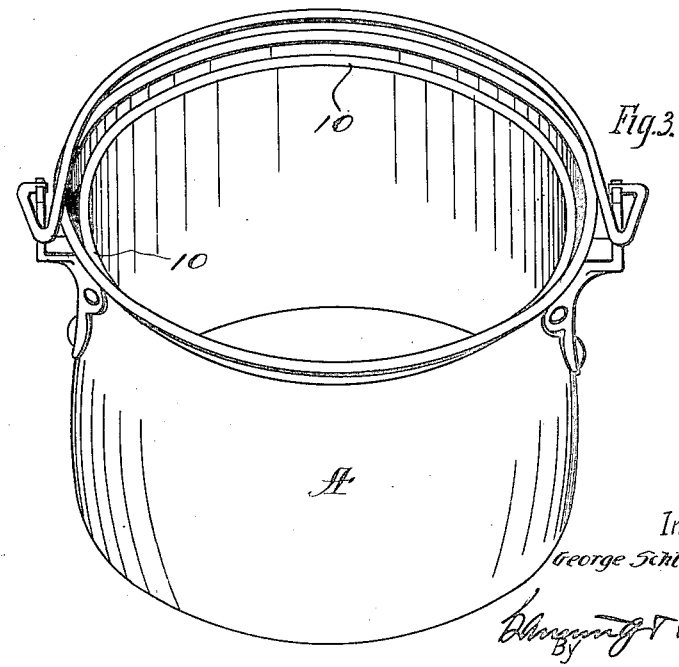
Fig. 3 is a similar view of the vessel or kettle with which the preceding elements are used.

Referring now to Fig. 2, wherein the tray is exhibited in perspective, it will be noted that the same consists of a flat circular bottom 15 provided with upstanding marginal walls 16 which are turned outwardly as at 17 to form a flange adapted to rest upon the vessel shoulder 10. The bottom of the tray is deformed by a punching or drawing operation to provide a plurality of depending nipples 18 of peculiar contour. As shown best in Fig. 5, each nipple is in the general form of a cone the walls of which have a parabolic curvature, and at its lower or smaller end each nipple is provided with a small opening or perforation 20. The walls of each nipple are, furthermore, tapered so as to present adjacent each hole a narrow or sharp edge as at 21. Similar nipples are formed over the entire bottom of the tray, the same being arranged closely together so as to leave adjacent the base of each nipple a minimum area of plane surface denoted as 22.

Referring now to Figs. 4 and 5, the cover or lid therein shown is formed with a plurality of annular crimps 25 each pointing downwardly to provide on the under or concave face of the cover a series of relatively sharp rings. These rings are concentric with the center of the cover and provide between them relatively flat circular areas each denoted by the numeral 26, which incline increasingly downward toward the edge of the cover in conformity with the crowned contour thereof.

A cooking utensil constructed in accordance with this invention will, in service, operate in a very effective and satisfactory manner. When water in the vessel is brought to the boiling point, the steam which develops in the first stages of the cooking operation will rise into contact with the under side of the tray. Condensation will occur most readily on those parts of the tray which have the greatest heat absorbing capacity. The plane surface of the tray adjacent the nipple bases which is of uniform thickness possesses a greater heat conducting capacity than the nipples with their tapering walls which are disposed downwardly close to the source of heat, and for this reason, among others, the first condensate will be formed on those portions of the tray bottom which extend between the nipple bases. As already stated, the area of such portions of the tray bottom is relatively small due to the formation thereon of the maximum number of nipples of which the material is capable. The condensate so collecting around the base of each nipple will take the form of globules which will tend to run down the sides of the nipple as soon as their volume and weight is sufficient to overcome the resistance of the surface adhesion. While traveling downwardly along the walls of the nipple, the globules will take on size and weight with the absorption of other proximate condensates. The peculiar parabolic shape of the nipple is of advantage in affording a surface which gradually approaches the horizontal, thereby providing a gradually increasing surface of adhesion for the condensate globules.

The condensate globules gradually increasing in size and weight as they travel toward the apex of a nipple, an increase in speed of travel also occurs, but this is checked toward the apex of the nipple where the curvature of its walls approaches the horizontal. Due to this deceleration in movement of the globules, also the increased area of surface over which the globules are now spread, a condition is created which facilitates the agglomeration of a number of small globules on the sharp edge 21 surrounding the hole at the apex of the nipple, and which retards the falling of the globules therefrom. Such being the case, a number of globules of small size will collect around the sharp edge of each nipple and will adhere thereto until they have developed sufficiently in size to form one globule which closes the nipple hole 20. These holes or perforations in each instance are very small, and due to the small area of the surrounding edge only a small surface of adherence is presented such as to sustain a globule whose size and weight is small. From this it results that the excess of condensate accumulating in the form of globules around the apex of each nipple is required to drop down into the vessel, this action occurring with considerable frequency. The effect of this is to maintain a steady downpour into the vessel of the condensate, resulting in a uniform seasoning of the materials which are being cooked.

It will be noted that the tray which lies intermediately of the vessel and cover defines an upper and a lower zone. During the initial stages of the cooking operation, the steam is preheated so as to escape from the lower zone through the perforations 20 into the upper zone, and thence condense on the inside of the cover. This condensation takes place chiefly upon the flat surfaces thereof, the globules then traveling radially to collect on the proximate crimp or ring 25. From these relatively sharp crimps on the cover the globules fall back into the tray over every portion of its surface, some dropping directly into the nipples. The shock resulting from the falling of these globules into the nipples will tend to dislocate or push off the condensate globules gathering on the lower side thereof, and thereby assist in hastening the periods of repeated condensing and redistilling.

As the cooking operation continues, the temperature of the tray and cover will increase, but the tray being protected from the atmosphere is the first to suffer a decrease in condensing capacity, with the result that condensation thereon will eventually cease entirely on its under side. The cover, however, which is exposed to the temperature of the surrounding atmosphere remains relatively cool and so will still continue to function as a condenser. The globules of moisture gathering on the under side of the cover will fall from its annular rings onto the tray therebelow, closing the nipple holes so as to thereby increase the insulating capacity of the tray. As shown, the circular rings on the cover are spaced apart at regular intervals, and this is for the purpose of effecting a substantially uniform collection and distribution of the globules. The annular ring closest to the outer edge of the cover not only gathers the condensate globules, but also prevents these globules from traveling around the periphery of the cover, thence around the periphery of the tray, and finally into the kettle adjacent the walls thereof. This acts to prevent the accumulation of fatty or other substances in the spaces adjacent the peripheries of the cover and tray and upon the vessel shoulder where these parts are rested.

If at any time the cover be removed from the vessel, a certain amount of steam and vapor will, of course, escape, but only such as is present in the upper zone. The steam is, furthermore, not of a sufficiently high temperature to injure the hand which may come in contact therewith. The greater temperature is in the lower zone, but eventually, with prolongation of the cooking operation, the temperature in the upper zone is increased to such an extent that the cover will no longer act as a condensing agent. When this stage is reached, the constricted openings through the several nipples will not remain sealed as theretofore, so that steam will travel freely from one zone to the other. This movement between the two zones is limited, however, being regulated by the difference in temperatures between the two zones. Based upon prevailing temperatures in these zones, there will always be a difference in the pressures therein, and this difference regulates the amount of steam that would be present in the upper zone.

To replenish the liquid contents in the kettle, the cover, of course, must be removed. In so doing, cold air is immediately brought in contact with the tray, and the chill resulting therefrom revives its condensing capacity. Water may be added to the liquid in the vessel by pouring the same directly into the tray. Being cooler than the tray itself, the water is possessed of a high heat absorbing capacity, and in consequence takes heat from the tray, thereby increasing its condensing capabilities. The temperature of the water is at the same time increased preliminary to passing through the tray into the vessel therebelow. As the nipple openings are very small, the water drains into the body of the vessel very slowly and consequently is preheated by its prolonged contact with the tray walls. As the water passes through the tray into the lower zone, the steam therewithin is condensed by the numerous small streams of water which drain through the perforations of the nipples. The result is that the water becomes highly heated before it is received into the body of the boiling liquid within the vessel. It will be noted further that during this operation no loss of steam occurs from the lower part of the vessel, the condensation therewithin being so sudden as to prevent the escape of steam around the tray edges. Due to the slow passing of the water through the tray into the vessel, ample time is provided for the replacement of the cover before steam in the lower zone can escape.

With a utensil constructed according to my invention spices may be placed on the tray so that their seasoning qualities will be extracted by the steam to be later transferred with the condensed globules to the boiling contents of the vessel. Meat and vegetables may also be steamed on the tray and the juices extracted therefrom in the form of vapors which will be condensed upon the cover and then fall back again on these food products in the form of globules, thereby seasoning the same in a uniform and lucious manner.

The preceding description has been concerned with a vessel or kettle of ordinary construction, the tray and cover being specially formed to co-operate therewith in the manner explained. In Figs. 7 and 8, I have shown the same construction applied to a broiler or frying pan which differs only in that the body of the broiler is formed of two parts in accordance with usual practice. In other respects the construction is the same so that no further description thereof is deemed necessary.

I claim:

1. In a cooking utensil, the combination of a vessel formed interiorly with an annular shoulder in its upper region, a tray having an outwardly extending flange adapted to rest on the shoulder whereby it is supported in an elevated position within the vessel, a cover arranged over the tray in spaced relation and providing a closure for the vessel wherein upper and lower zones are defined by the tray, the tray bottom being formed with a plurality of downwardly depending nipples in closely spaced relation leaving between them a plane surface of relatively small area and the walls of each nipple being tapered toward its smaller end through which is formed a constricted opening surrounded by a fine circular edge, the openings through the several nipples being adapted for sealing by condensate dropping either therethrough from the upper zone or by condensate collecting upon the exterior of the nipples within the lower zone, substantially as described.

2. In a cooking utensil, the combination of a vessel, a cover adapted to provide a closure therefor, and means within the vessel defining upper and lower zones therein, said means consisting of a steaming tray extending horizontally across the vessel and formed with a plurality of nipples depending from its bottom in closely spaced relation such that the residuary plane surface is relatively small and the walls of each nipple being tapered toward a point through which is formed a constricted opening adapted to be sealed by condensate at times during the cooking operation whereby the steaming tray serves as a closure between two zones within the vessel, substantially as described.

3. In a cooking utensil, the combination of a vessel, a tray, and a cover, the tray having a bottom from which upstand marginal walls having an outwardly turned flange, means within the vessel on which the tray flange may rest to support the tray in an elevated position therewithin, the cover being adapted for positioning in an elevated position relative to the tray bottom, and to provide for the vessel a closure within which the tray serves to define upper and lower zones, and a plurality of nipples depending from the tray bottom in closely spaced relation such that the resultant plane surface is reduced substantially to a minimum, each of the nipples being formed in its apex with a constricted opening of a size which is adapted to be sealed at times by globules of condensation whereby the tray serves as a closure between the two zones of the vessel, the nipple openings at other times permitting such globules to pass therethrough from the upper into the lower zone, substantially as described.

GEORGE SCHLUESSELBURG.

Witness:
EPHRAIM BANNING.